US010205759B2

(12) United States Patent
Hardt et al.

(10) Patent No.: US 10,205,759 B2
(45) Date of Patent: Feb. 12, 2019

(54) RETRIEVAL OF WIRELESS NETWORK CREDENTIALS

(71) Applicant: ARRIS Enterprises LLC, Suwanee, GA (US)

(72) Inventors: Charles Hardt, Lawrenceville, GA (US); Albert F. Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 197 days.

(21) Appl. No.: 15/069,424

(22) Filed: Mar. 14, 2016

(65) Prior Publication Data
US 2017/0264654 A1    Sep. 14, 2017

(51) Int. Cl.
*G06F 15/16* (2006.01)
*H04L 29/06* (2006.01)
*H04L 29/08* (2006.01)

(52) U.S. Cl.
CPC .......... *H04L 65/4023* (2013.01); *H04L 67/06* (2013.01); *H04L 67/1097* (2013.01); *H04L 67/36* (2013.01)

(58) Field of Classification Search
CPC . H04L 65/4023; H04L 67/06; H04L 67/1097; H04L 67/36
USPC ........................................................ 709/217
See application file for complete search history.

(56) References Cited

U.S. PATENT DOCUMENTS

| 6,184,883 | B1 * | 2/2001 | Bates | G06F 3/0481 715/794 |
| 8,244,179 | B2 * | 8/2012 | Dua | G06F 17/30058 340/10.51 |
| 8,600,382 | B2 * | 12/2013 | Hicks, III | H04L 12/2838 370/331 |
| 8,818,276 | B2 * | 8/2014 | Kiukkonen | H04L 63/107 455/41.1 |
| 8,838,836 | B1 * | 9/2014 | Li | H04L 67/104 709/204 |
| 2010/0166186 | A1 * | 7/2010 | Shiba | H04W 12/04 380/278 |
| 2010/0250984 | A1 * | 9/2010 | Lee | G06F 1/3203 713/320 |
| 2012/0158979 | A1 * | 6/2012 | Lee | H04W 48/20 709/229 |
| 2013/0036231 | A1 * | 2/2013 | Suumaki | H04L 63/18 709/228 |
| 2013/0080520 | A1 * | 3/2013 | Kiukkonen | G06Q 50/01 709/204 |

(Continued)

OTHER PUBLICATIONS

Dlink ("DGL-5500_Reva_manual_1.1_EN.Pdf" Mar. 11, 2014—pp. 1-115).*
YouTube Snapshot "YouTube_Dlink_DGL-5500_Tutorial_03112014".*

*Primary Examiner* — Phuoc H Nguyen
(74) *Attorney, Agent, or Firm* — Bart A. Perkins

(57) ABSTRACT

Methods, systems, and computer readable media may be operable to facilitate a retrieval and display of network credentials. A predetermined input may be received at a client, wherein the predetermined input initiates a retrieval of network credentials such as network identifiers and corresponding passwords or passphrases. The client may aggregate retrieved network credentials associated with one or more networks that may be available to a user, and may output the aggregated credentials to a display.

12 Claims, 5 Drawing Sheets

(56) References Cited

U.S. PATENT DOCUMENTS

| | | | | |
|---|---|---|---|---|
| 2013/0347073 A1* | 12/2013 | Bryksa | .................. | H04L 63/105 |
| | | | | 726/4 |
| 2014/0195654 A1* | 7/2014 | Kiukkonen | ............. | H04W 8/00 |
| | | | | 709/220 |
| 2014/0325019 A1* | 10/2014 | Austin | .................... | H04L 41/12 |
| | | | | 709/217 |
| 2016/0036944 A1* | 2/2016 | Kitchen | .................. | H04L 67/12 |
| | | | | 709/203 |
| 2016/0043962 A1* | 2/2016 | Kim | ...................... | H04W 4/008 |
| | | | | 709/224 |

* cited by examiner

RETRIEVAL OF WIRELESS NETWORK CREDENTIALS

TECHNICAL FIELD

This disclosure relates to the retrieval of wireless network credentials.

BACKGROUND

One or more access points may be installed within a customer premise for the purpose of providing a wireless network for connecting and delivering services to one or more client devices or wireless stations. Generally, an access point is associated with wireless credentials (e.g., password or passphrase, pre-shared key string, service set identifier(s) (SSID), a specific frequency band (e.g., 2.4 GHz, 5 GHz), etc.) that provide a security layer for access to a wireless network provided by the access point. Typically, a wireless access point is pre-configured with a default wireless profile including preset wireless credentials. For example, credentials may be a simple password or a random pre-shared key (PSK) string preset according to vendor specifications.

In a typical premise that includes one or more wireless networks, existing or new devices (e.g., wireless stations or clients) will periodically attempt to join an available wireless network. In order to join a network provided by an access point, or to otherwise associate a wireless client with the access point, a user will typically need to follow one or more of the existing setup procedures. A Wi-Fi protected setup (WPS) button may be used to associate one or more wireless clients with the access point. However, use of a WPS button may not be supported for all devices or may not be convenient for a user. A user might enter a preset WPS access point personal identification number (PIN) code to associate a wireless client with the access point. However, this method still requires that a user read or remember the preset PIN code from an access point label.

Another existing method for associating a wireless client with a wireless network is the manual selection and entry of network credentials (e.g., entry of a SSID and password associated with a wireless network). The default SSID(s) of most access points is typically cryptic and difficult to remember. Further, within a home network, there can be multiple SSIDs for any given band (e.g., 2.4 GHz band and 5 GHz band may be provided by a single access point). Moreover, in multiple dwelling unit (MDU) scenarios, a client device might possibly see a large number of SSIDs associated with various neighboring subscribers. Therefore, a method of determining which network to join would be beneficial to a user of a wireless device.

Many access point vendors now place stickers with the default SSID(s) and password(s) on the outside of the access point (e.g., gateway device, modem, etc.), and this sticker is typically placed on the bottom or back of the access point. Therefore, in most cases, a user is forced to locate the sticker on an access point in order to identify network credentials of a specific wireless network. This can be an inconvenient process for a user to go through. Moreover, the access point may be located within a premise at a location that is some distance away from the current position of a user or that is otherwise inconvenient for a user to reach. Therefore, a need exists for improving methods and systems for identifying network credentials for network(s) that may be available to a user.

BRIEF DESCRIPTION OF THE DRAWINGS

Like reference numbers and designations in the various drawings indicate like elements.

DETAILED DESCRIPTION

Figure 1:
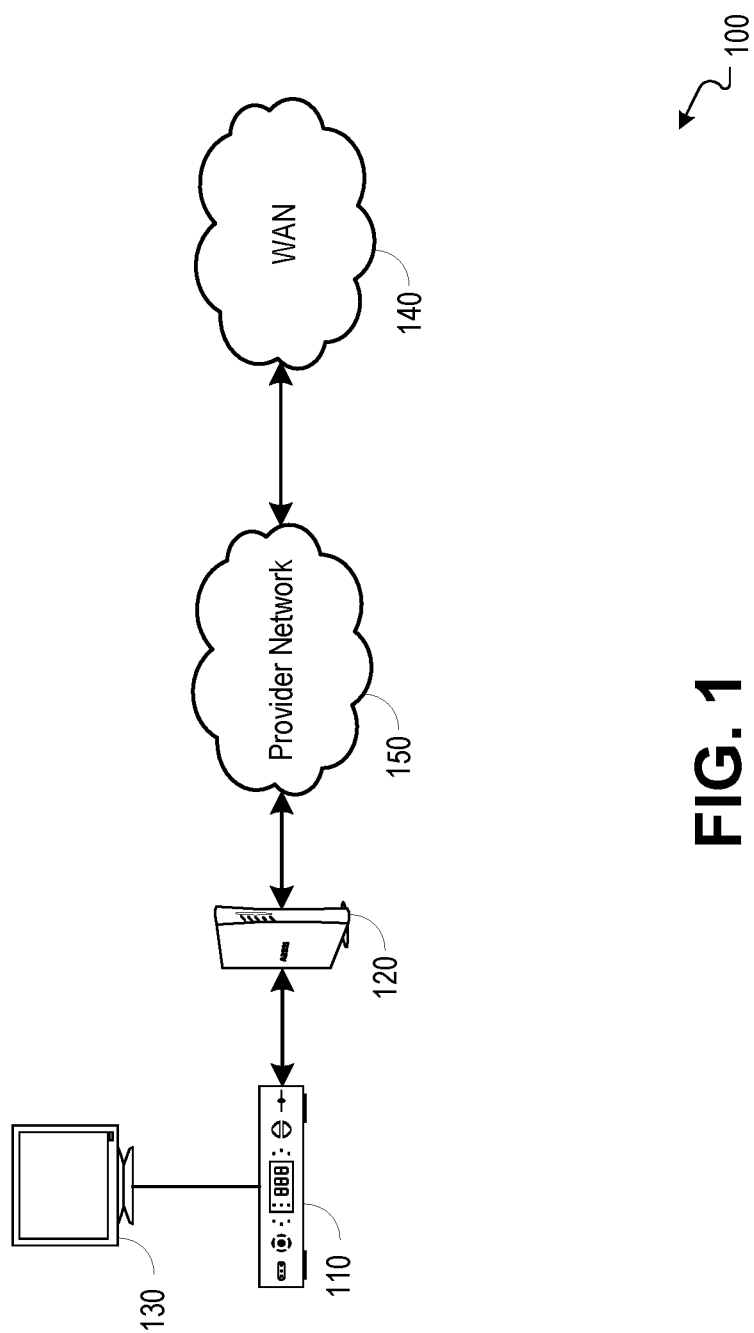
FIG. 1 is a block diagram illustrating an example network environment operable to facilitate a retrieval and display of network credentials.

It is desirable to improve upon methods and systems for retrieving network credentials. Methods, systems, and computer readable media may be operable to facilitate a retrieval and display of network credentials. A predetermined input may be received at a client, wherein the predetermined input initiates a retrieval of network credentials such as network identifiers and corresponding passwords or passphrases. The client may aggregate retrieved network credentials associated with one or more networks that may be available to a user, and may output the aggregated credentials to a display.

An embodiment of the invention described herein may include a method comprising: (a) receiving a predetermined input at a client device; (b) retrieving network credential information in response to the predetermined input, wherein the network credential information is associated with one or more wireless networks; (c) generating a credential summary comprising the retrieved network credential information; and (d) outputting the credential summary to a display, wherein the retrieved network credential information is presented at the display.

According to an embodiment of the invention, the network credential information is retrieved from one or more access points providing one or more of the wireless networks.

According to an embodiment of the invention, the method described herein further comprises: (a) downloading network credential information from one or more access points; (b) storing the downloaded network credential information at storage of the client device; and (c) wherein the network credential information is retrieved from the storage of the client device.

According to an embodiment of the invention, the retrieved network credential information comprises a unique network identifier and an associated password.

According to an embodiment of the invention, the retrieved network credential information comprises an identification of a frequency band associated with each of the one or more wireless networks.

According to an embodiment of the invention, the client device comprises a set-top box.

According to an embodiment of the invention, the retrieved network credential information is presented at an in-focus graphics layer of the display.

An embodiment of the invention described herein may include an apparatus comprising: (a) an interface configured to be used to receive a predetermined input; (b) a module configured to: (i) retrieve network credential information in response to the predetermined input being received, wherein the network credential information is associated with one or more wireless networks; and (ii) generate a credential summary comprising the retrieved network credential information; and (c) an interface configured to be used to output the credential summary to a display, wherein the retrieved network credential information is presented at the display.

An embodiment of the invention described herein may include one or more non-transitory computer readable media having instructions operable to cause one or more processors to perform the operations comprising: (a) receiving a predetermined input at a client device; (b) retrieving network credential information in response to the predetermined input, wherein the network credential information is associated with one or more wireless networks; (c) generating a credential summary comprising the retrieved network credential information; and (d) outputting the credential summary to a display, wherein the retrieved network credential information is presented at the display.

FIG. 1 is a block diagram illustrating an example network environment 100 operable to facilitate a retrieval and display of network credentials. In embodiments, one or more clients 110 (e.g., set-top box (STB), mobile devices, tablets, gaming consoles, pluggable content-streaming devices, etc.) and one or more access points 120 may provide video and/or data services to a subscriber. For example, an access point 120 may deliver video services to a client 110, and the client 110 may output multimedia content to a display device 130 (e.g., television).

An access point 120 may communicate with one or more clients 110 over a local network (e.g., a local area network (LAN), a wireless local area network (WLAN), a personal area network (PAN), etc.) and may communicate with an upstream wide area network (WAN) 140 through a connection to a provider network 150. It should be understood that a client 110 may include any device operable to communicate with an access point 120. An access point 120 may include a gateway device, a modem, a wireless router including an embedded modem, a wireless network extender or any other device operable to deliver services to a client 110. It will be appreciated that an access point 120 may communicate with a client 110 over a wired or a wireless connection. While the access point 120 is shown as only being connected to a single client 110, it should be understood that the access point 120 may be connected to or associated with (e.g., via wired or wireless connections) a plurality of clients 110 including various devices that may be configured to receive video, data, and/or voice services from the access point 120. For example, the access point 120 may be connected to or associated with a plurality of clients 110 or display devices 130, mobile devices, tablets, and others.

A connection between a client 110 and the access point 120 may be established according to network credentials associated with the access point 120. For example, the access point 120 may provide one or more WLANs, and each WLAN may be identified by a service set identifier (SSID). A WLAN provided by an access point 120 may be protected by a password or may be a public network that is not password-protected.

In embodiments, a client 110 may be configured to initiate a retrieval and display of network credentials. The client 110 may initiate a retrieval and display of network credentials in response to receiving a predefined input. For example, the predefined input may be the depressing of a certain button, and said certain button may be a physical button located at a STB or other client 110 or may be a button at a remote control unit (RCU) associated with the STB or other client 110. The predefined input may be the depressing of the certain button for a predetermined duration (e.g., 3, 5, 7 seconds, etc.).

In embodiments, when the predefined input is received at the client 110, the client 110 may retrieve network credentials associated with one or more networks that may be available to a user. For example, the client 110 may retrieve network credentials from one or more access points 120. Network credentials may be stored and updated at the client 110.

It should be understood that the retrieved network credentials may include network credentials associated with wireless networks provided by a plurality of access points 120. Thus, network credentials provided to a client 110 are not limited to network credentials of an access point 120 providing services to the client 110. A client 110 may retrieve network credentials for each wireless network that may be available to a user, regardless of the access point 120 providing the wireless network.

Network credentials may include a variety of information associated with one or more networks that may be available to a user, including, but not limited to, SSID(s), network passwords or passphrases, frequency band information, supported wireless channels, bandwidth information, and others. The client 110 may organize retrieved network credentials into a user interface (e.g., graphical user interface (GUI), textual user interface (TUI), dialog box, etc.), and the user interface including the network credentials may be output to a display (e.g., display device 130 or other display associated with a client 110).

Figure 2:
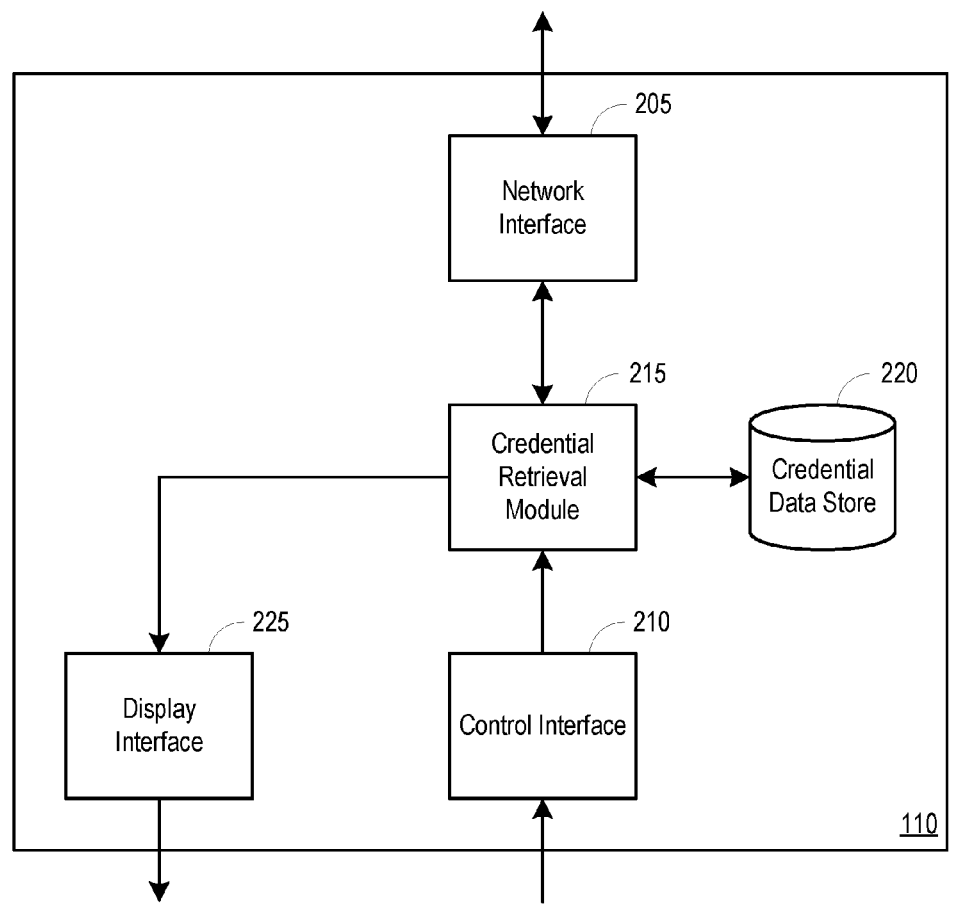
FIG. 2 is a block diagram illustrating an example client operable to facilitate a retrieval and display of network credentials.

FIG. 2 is a block diagram illustrating an example client 110 operable to facilitate a retrieval and display of network credentials. The client 110 may include a network interface 205, a control interface 210, a credential retrieval module 215, a credential data store 220, and a display interface 225.

In embodiments, multiple services may be received at the client 110 through a network interface 205. The network interface 205 may be used to receive communications from and to output communications to an access point 120 of FIG. 1.

In embodiments, the client 110 may receive, through the control interface 210, a predetermined input for initiating a retrieval of network credentials. The control interface 210 may include one or more physical buttons (e.g., physical buttons at a front panel of a client 110 such as a STB) or may include a receiver (e.g., infrared (IR) receiver, radio-frequency (RF) receiver, Bluetooth interface, etc.) for receiving signals from a remote control unit (RCU). The predetermined input may be the depressing of one or more buttons for a predetermined duration. For example, when a physical button located at the control interface 205 or a button at an associated RCU is depressed for a predetermined duration (e.g., 3, 5, 7 seconds, etc.), the client 110 may initiate a retrieval and display of network credentials. It should be understood that various other methods may be used for delivering a predetermined input to a client 110.

In embodiments, when the predetermined input is received at the client 110, the credential retrieval module 215 may retrieve network credentials. It should be understood that the retrieved network credentials may include various information associated with one or more networks. For example, retrieved network credentials may include, but is not limited to, service set identifier(s) (SSID), network password(s), frequency band information (e.g., 2.4 GHz or 5 GHZ band), and others. Network credentials for a plurality of networks (e.g., local area network (LAN), wireless local area network (WLAN), etc.) may be retrieved and displayed to a user. For example, network credentials for each network that is available to a user may be retrieved and displayed to the user.

In embodiments, network credentials may be retrieved from the credential data store 220. Network credentials may be stored and may be updated at the credential data store 220. Credentials may be retrieved from one or more access points 120 through the network interface 205. Network credentials for one or more networks that are provided by an access point 120 may be received by the client 110 from the access point 120 and may be stored at the credential data store 220. Credentials may be updated at the credential data store 220 periodically, or may be updated when a change is made to the network credentials. The credential data store 220 may include storage including non-volatile memory.

In embodiments, the credential retrieval module 215 may request and retrieve network credentials from a network device when the predetermined input is recognized. For example, the credential retrieval module 215 may output a request to and may receive network credentials from an access point 120 of FIG. 1 through the network interface 205.

In embodiments, the credential retrieval module 215 may generate a user interface that includes the retrieved network credentials. The retrieved network credentials may be prepared by the credential retrieval module 215 for display in a graphical user interface (GUI), textual user interface (TUI), dialog box, or any other interface that may be displayed to a user.

The user interface generated by the credential retrieval module 215 may be output to a display (e.g., display device 130 of FIG. 1) through a display interface 225. In embodiments, the generated user interface may be output to the display at an in-focus graphics layer. For example, the user interface may be displayed on top of all other layers (e.g., guide, menu, content layers, etc.) that may be currently displayed on the display device 130. The user interface may be output to the display for a predetermined period of time, or until a command is received from a user to terminate the displayed network credentials.

Figure 3:
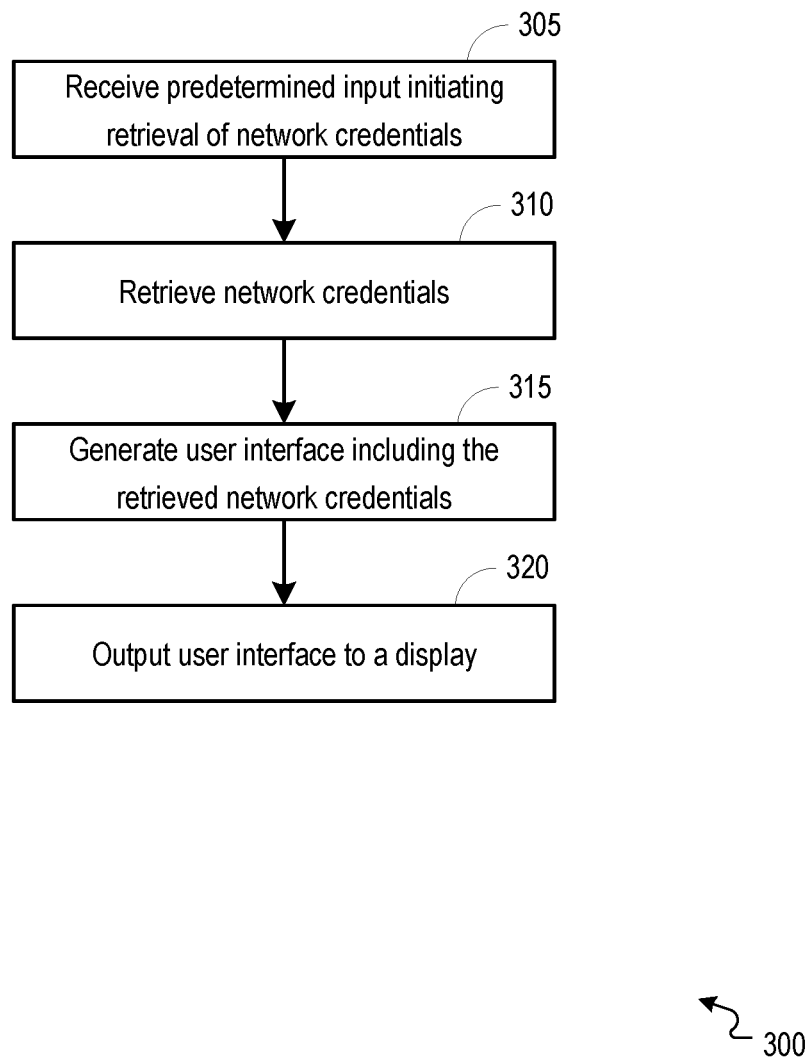
FIG. 3 is a flowchart illustrating an example process operable to facilitate a retrieval and display of network credentials.

FIG. 3 is a flowchart illustrating an example process 300 operable to facilitate a retrieval and display of network credentials. The process 300 may begin at 305, when a predetermined input for initiating a retrieval of network credentials is received at a customer premise equipment (CPE) device (e.g., client 110 of FIG. 1, gateway device, access point, or any other CPE device). In embodiments, the predetermined input for initiating a retrieval of network credentials may be the depressing of a predefined button. It should be understood that the predefined button may be a button on a remote control unit (RCU) associated with the client 110 or may be a button that is physically located on the client 110 (e.g., button on the front panel of the client 110). The depressing of the predefined button may be recognized by an interface of the client 110 (e.g., control interface 210). It should be understood that the process 300 may be carried out by various types of clients associated with a central device (e.g., access point 120 of FIG. 1) including, but not limited to STBs, mobile devices, tablets, pluggable content-streaming devices, and others.

In embodiments, the predetermined input initiating the retrieval of network credentials may be the depressing of the predefined button for a predetermined duration. For example, when a RCU button or a physical button located at the client 110 is depressed for a predetermined duration (e.g., 3, 5, 7 seconds, etc.), the client 110 may initiate the retrieval and display of network credentials. It should be understood that various other methods may be used for delivering a predetermined input to a client 110.

At 310, network credentials may be retrieved by the client 110. In embodiments, network credentials may be retrieved from storage at the client 110 (e.g., credential data store 220 of FIG. 2). For example, the client 110 may maintain current network credentials at the credential data store 220. The client 110 may periodically, or whenever a change is made to network credentials, receive network credentials from a home network device (e.g., access point 120 of FIG. 1). The client 110 may request and receive network credentials from a home network device (e.g., access point 120). For example, the client 110 may request information from the access point 120 concerning which wireless bands are supported, which wireless channels are supported, available bandwidth, and other information (e.g., information as supported by 802.11). Network credentials may be shared between an access point 120 and a client 110 via a variety of mechanisms and communication protocols including, but not limited to 802.11, control and provisioning of wireless access points (CAPWAP), HTTP Get/Put, and others. It will be appreciated by those skilled in the relevant art that communications carrying network credentials from an access point 120 to a client 110 may be encrypted.

At 315, a credential summary including the retrieved network credentials may be generated. The credential summary including the network credentials may be generated, for example, by the credential retrieval module 215 of FIG. 2. In embodiments, the credential summary may include credential information including, but not limited to, service set identifier(s) (SSID), password(s), network information (e.g., frequency band information, channel information, bandwidth information, etc.), and others. The credential retrieval module 215 of FIG. 2 may aggregate retrieved network credential information associated with one or more wireless networks (or SSIDs), and may organize the aggregated information into the credential summary. The credential summary may be a user interface that is generated according to various layouts/formats, and may be prepared for display to a user as a graphical user interface (GUI), textual user interface (TUI), dialog box, and others.

At 320, the generated credential summary may be output to a display. In embodiments, the credential summary may be output to a display device 130 of FIG. 1, and may be output through the display interface 225 of FIG. 2. The credential summary may be presented to a user as GUI, TUI, or dialog box on a display device 130 (e.g., television) associated with the client 110, and the credential summary may include network credential information associated with one or more networks that may be available to the user. The credential summary may be displayed at the in-focus graphics layer on the display device 130. For example, the credential summary may be displayed on top of all other layers (e.g., guide, menu, content layers, etc.) that may be currently displayed on the display device 130.

Figure 4:
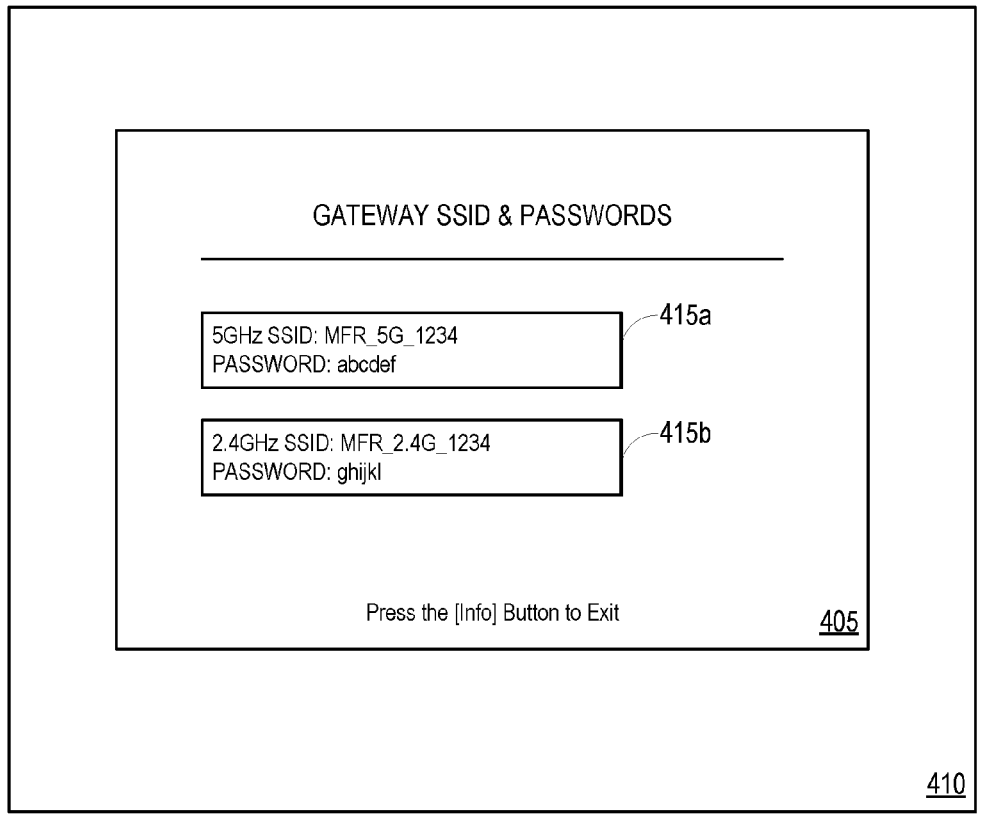
FIG. 4 is an illustration of an example user interface displaying network credentials.

FIG. 4 is an illustration of an example user interface 405 displaying network credentials. The user interface 405 may be output to a display 410 (e.g., display of a display device 130 of FIG. 1). In embodiments, the user interface 405 may be displayed at the in-focus graphics layer on the display 410 such that the user interface 405 is displayed on top of all other layers (e.g., guide, menu, content layers, etc.) of the display 410.

In embodiments, the user interface 405 may include one or more network credential summaries (e.g., credential summaries 415a-b). Each of the one or more network credential summaries may include information associated with a network that may be available to a user. For example, each network credential summary may include a unique network identifier (e.g., SSID), password or passphrase, frequency band information (e.g., 2.4 GHz or 5 GHz), and other information. It should be understood that multiple 5 GHz and/or multiple 2.4 GHz SSIDs may be identified and displayed within the user interface 405.

The user interface 405 may include an option or instructions (e.g., 'Press the [Info] Button to Exit') for closing the user interface 405 or removing the user interface 405 from the display 410.

Figure 5:
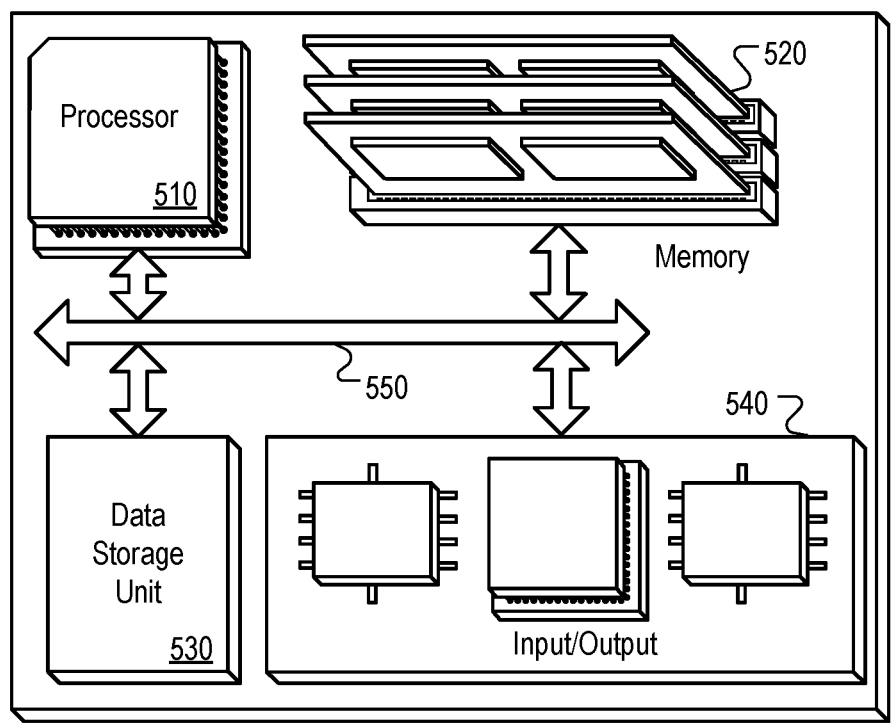
FIG. 5 is a block diagram of a hardware configuration operable to facilitate a retrieval and display of network credentials.

FIG. 5 is a block diagram of a hardware configuration 500 operable to facilitate a retrieval and display of network credentials. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., access point 120 of FIG. 1, cable modem, router, wireless extender, or other access device) or subscriber device (e.g., client 110 of FIG. 1, display device 130 of FIG. 1, etc.). In another implementation, the input/output device can include driver devices configured to send communications to, and receive communications from one or more networks (e.g., WAN 140 of FIG. 1, provider network 150 of FIG. 1, local network, etc.).

Those skilled in the art will appreciate that the invention described herein improves upon methods and systems for identifying network credentials. Methods, systems, and computer readable media may be operable to facilitate a retrieval and display of network credentials. A predetermined input may be received at a client, wherein the predetermined input initiates a retrieval of network credentials such as network identifiers and corresponding passwords or passphrases. The client may aggregate retrieved network credentials associated with one or more networks that may be available to a user, and may output the aggregated credentials to a display.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a predetermined input at a client device, wherein the client device comprises a set-top box;
   retrieving network credential information in response to the predetermined input, wherein the network credential information is associated with one or more wireless networks, wherein the retrieved network credential information comprises an identifier associated with each of the one or more wireless networks and a password associated with each of the one or more wireless networks, wherein the network credential information is retrieved from one or more access points that support the one or more wireless networks, and wherein the retrieved network credential information is stored at the client device;
   when a change is made to the network credential information associated with one or more of the wireless networks, updating the network credential information stored at the client device to reflect the change;
   generating a credential summary comprising the retrieved network credential information, wherein the credential summary is generated using the network credential information that is stored at the client device; and
   outputting the credential summary to a display, wherein the retrieved network credential information is output from the client device and presented at the display, and wherein the display is connected to the client device.

2. The method of claim 1, further comprising:
   downloading network credential information from one or more access points;
   storing the downloaded network credential information at storage of the client device; and
   wherein the network credential information is retrieved from the storage of the client device.

3. The method of claim 1, wherein the retrieved network credential information comprises an identification of a frequency band associated with each of the one or more wireless networks.

4. The method of claim 1, wherein the retrieved network credential information is presented at an in-focus graphics layer of the display.

5. An apparatus comprising:
   an interface configured to be used to receive a predetermined input;
   a module configured to:
   retrieve network credential information in response to the predetermined input being received, wherein the network credential information is associated with one or more wireless networks, and wherein the retrieved network credential information comprises an identifier associated with each of the one or more wireless networks and a password associated with each of the one or more wireless networks, wherein the network credential information is retrieved from one or more access points that support the one or more wireless networks, and wherein the retrieved network credential information is stored at a data store of the apparatus;
   when a change is made to the network credential information associated with one or more of the wireless networks, updating the network credential information stored at the data store to reflect the change; and
   generate a credential summary comprising the retrieved network credential information, wherein the credential summary is generated using the network credential information that is stored at the data store; and
   an interface configured to be used to output the credential summary to a display, wherein the retrieved network credential information is presented at the display.

6. The apparatus of claim 5, further comprising a data store configured to be used to store network credential information that is downloaded from one or more access points, wherein the network credential information associated with the one or more wireless networks is retrieved from the data store.

7. The apparatus of claim 5, wherein the retrieved network credential information comprises an identification of a frequency band associated with each of the one or more wireless networks.

8. The apparatus of claim 5, wherein the retrieved network credential information is presented at an in-focus graphics layer of the display.

9. One or more non-transitory computer readable media having instructions operable to cause one or more processors to perform the operations comprising:
   receiving a predetermined input at a client device, wherein the client device comprises a set-top box;
   retrieving network credential information in response to the predetermined input, wherein the network credential information is associated with one or more wireless networks, wherein the retrieved network credential information comprises an identifier associated with each of the one or more wireless networks and a password associated with each of the one or more wireless networks, wherein the network credential information is retrieved from one or more access points that support the one or more wireless networks, and wherein the retrieved network credential information is stored at the client device;
   when a change is made to the network credential information associated with one or more of the wireless networks, updating the network credential information stored at the client device to reflect the change;

generating a credential summary comprising the retrieved network credential information, wherein the credential summary is generated using the network credential information that is stored at the client device; and outputting the credential summary to a display, wherein the retrieved network credential information is output from the client device and presented at the display, and wherein the display is connected to the client device.

10. The one or more non-transitory computer-readable media of claim 9, wherein the instructions are further operable to cause one or more processors to perform the operations comprising:

downloading network credential information from one or more access points;

storing the downloaded network credential information at storage of the client device; and wherein the network credential information is retrieved from the storage of the client device.

11. The one or more non-transitory computer-readable media of claim 9, wherein the retrieved network credential information comprises an identification of a frequency band associated with each of the one or more wireless networks.

12. The one or more non-transitory computer-readable media of claim 9, wherein the retrieved network credential information is presented at an in-focus graphics layer of the display.

* * * * *